(12) United States Patent
Nissen

(10) Patent No.: US 11,231,019 B2
(45) Date of Patent: Jan. 25, 2022

(54) ELECTRICITY GENERATION PROCESS

(71) Applicant: Applied Biomimetic A/S, Nordborg (DK)

(72) Inventor: Steen Søndergaard Nissen, Ellicott City, MD (US)

(73) Assignee: APPLIED BIOMIMETIC A/S, Nordborg (DK)

( * ) Notice: Subject to any disclaimer, the term of this patent is extended or adjusted under 35 U.S.C. 154(b) by 221 days.

(21) Appl. No.: 16/082,164

(22) PCT Filed: Mar. 2, 2017

(86) PCT No.: PCT/EP2017/054972
§ 371 (c)(1),
(2) Date: Sep. 4, 2018

(87) PCT Pub. No.: WO2017/149101
PCT Pub. Date: Sep. 8, 2017

(65) Prior Publication Data
US 2019/0093639 A1 Mar. 28, 2019

Related U.S. Application Data

(60) Provisional application No. 62/303,633, filed on Mar. 4, 2016.

(30) Foreign Application Priority Data

Mar. 24, 2016 (GB) ...................................... 1605068

(51) Int. Cl.
*B01D 61/00* (2006.01)
*C02F 1/44* (2006.01)
(Continued)

(52) U.S. Cl.
CPC .............. *F03G 7/005* (2013.01); *B01D 61/00* (2013.01); *B01D 61/002* (2013.01);
(Continued)

(58) Field of Classification Search
CPC .... B01D 61/00; B01D 61/002; B01D 61/005; B01D 61/364; B01D 61/58;
(Continued)

(56) References Cited

U.S. PATENT DOCUMENTS

2002/0178723 A1 12/2002 Bronicki et al.
2009/0032446 A1* 2/2009 Wiemers ................... C02F 9/00
210/85
(Continued)

FOREIGN PATENT DOCUMENTS

| AU | 2007319995 | 8/2012 |
| CN | 1853044 | 10/2006 |

(Continued)

OTHER PUBLICATIONS

English language machine translation of WO 2013164541, 16 pages.*
(Continued)

*Primary Examiner* — Pranav N Patel
(74) *Attorney, Agent, or Firm* — Jackson Walker LLP; Christopher J. Rourk

(57) ABSTRACT

An electricity generation process is disclosed. The process comprises injecting an aqueous feed stream into a salt formation to dissolve the salt contained therein, and then extracting a saline stream containing said dissolved salt from the salt formation. The process also comprises converting latent osmotic energy present in said saline stream into electricity by passage through an osmotic power unit comprising a semi-permeable membrane which permits the passage of water but not the passage of salts in which said (Continued)

saline stream is passed over one side of the semi-permeable membrane, a low salinity stream being passed over the other side of said membrane. The process also comprises using an output stream derived from the low salinity stream as the aqueous feed stream.

20 Claims, 6 Drawing Sheets

(51) Int. Cl.
*F03G 7/00* (2006.01)
*H02K 7/18* (2006.01)
*F24T 10/00* (2018.01)

(52) U.S. Cl.
CPC ......... *B01D 61/005* (2013.01); *H02K 7/1823* (2013.01); *F24T 10/00* (2018.05); *Y02E 10/30* (2013.01)

(58) Field of Classification Search
CPC .......... B01D 2311/06; B01D 2311/103; B01D 2311/25; B01D 2311/246; C02F 1/001; C02F 1/445; C02F 2103/03; C02F 2103/08; F03G 7/005; F03G 7/04; F03G 7/00; Y02E 10/36; Y02E 10/10; Y02E 10/16; Y02E 70/30; F24T 10/00; H02K 7/1823

See application file for complete search history.

(56) References Cited

U.S. PATENT DOCUMENTS

| | | | |
|---|---|---|---|
| 2009/0261040 | A1 | 10/2009 | Pruet |
| 2010/0024423 | A1 | 2/2010 | McGinnis et al. |
| 2010/0071366 | A1 | 3/2010 | Klemencic |
| 2010/0192575 | A1 | 8/2010 | Al-Mayahi et al. |
| 2010/0282656 | A1* | 11/2010 | Cath .................. E03B 3/15 210/170.11 |
| 2011/0044824 | A1 | 2/2011 | Kelada |
| 2011/0046074 | A1 | 2/2011 | Kumar et al. |
| 2011/0272166 | A1 | 11/2011 | Hunt |
| 2013/0232973 | A1 | 9/2013 | McBay |
| 2013/0318870 | A1 | 12/2013 | Lim |
| 2014/0026567 | A1 | 1/2014 | Paripati et al. |
| 2014/0102095 | A1 | 4/2014 | Shim et al. |
| 2014/0138313 | A1* | 5/2014 | Sato .................. C02F 1/445 210/641 |
| 2014/0138956 | A1 | 5/2014 | Sano et al. |
| 2014/0319056 | A1* | 10/2014 | Fuchigami ........... B01D 63/043 210/648 |
| 2015/0352497 | A1* | 12/2015 | Sakai ................. C02F 1/441 210/252 |

FOREIGN PATENT DOCUMENTS

| | | |
|---|---|---|
| CN | 103547798 | 1/2014 |
| CN | 203505325 | 4/2014 |
| DE | 102009014576 | 9/2010 |
| JP | 2005-513383 | 5/2005 |
| JP | 2014061487 | 4/2014 |
| JP | 2014117653 | 6/2014 |
| JP | 2014200708 | 10/2014 |
| WO | 2004/011600 | 2/2004 |
| WO | 2005/017352 | 2/2005 |
| WO | 2010/091078 | 8/2010 |
| WO | 2012/133661 | 10/2012 |
| WO | 2012/140659 | 10/2012 |
| WO | 2013/033082 | 3/2013 |
| WO | 2013/043118 | 3/2013 |
| WO | 2013/090901 | 6/2013 |
| WO | 2013/164541 | 11/2013 |
| WO | 2015/058109 | 4/2015 |
| WO | WO2015058109 | * 4/2015 |
| WO | 2015104957 | 7/2015 |

OTHER PUBLICATIONS

Logan et al, Membrane-based processes for sustainable power generation using water. Nature 488, 313-319 (2012). (Year: 2012).*
Search Report dated Sep. 14, 2016 by the Intellectual Property Office for Application No. GB1605068.4, 4 pages.
O'Hern et al., "Selective Ionic Transport through Tunable Subnanometer Pores in Single-Layer Graphene Membranes", Nano Letter, American Chemical Society, 2014, pp. 1234-1241, vol. 14.
Cohen-Tanugi et al., "Water Desalination across Nanoporous Graphene", Nano Letter, American Chemical Society, 2012, pp. 3602-2308, vol. 12.
Helfer et al., "Osmotic power with Pressure Retarded Osmosis: Theory, performance and trends—A review", Journal of Membrane Science, 2014, pp. 337-358, vol. 453.
Lin et al., "Hybrid Pressure Retarded Osmosis-Membrane Distillation System for Power Generation from Low-Grade Heat: Thermodynamic Analysis and Energy Efficiency", Environmental Science & Technology, American Chemical Society, 2014, pp. 5306-5313, vol. 48.
The International Search Report and Written Opinion issued by the European Patent Office dated Apr. 11, 2016 for International Application No. PCT/EP2015/070431.
The International Preliminary Report on Patentability issued by the European Patent Office dated Mar. 14, 2017 for International Application No. PCT/EP2015/070431.
The Combined Search and Examination Report issued by UK Intellectual Property Office dated Feb. 24, 2015 for UK Patent Application No. GB 1415847.1.
McGinnis et al., "A Novel Ammonia-Carbon Dioxide Osmotic Heat Engine for Power Generation", Journal of Membrane Science, 2007, pp. 13-19, vol. 305.
Response to Office Action dated Oct. 19, 2018 by the European Patent Office for EP17708500.8 as-filed Apr. 17, 2019 at the European Patent Office, 3 pages.
Office Action dated Mar. 1, 2021 by the Japanese Patent Office for co-pending Japanese Application No. 2018-545653, with English Translation, 12 pages.

* cited by examiner

ELECTRICITY GENERATION PROCESS

RELATED APPLICATIONS

The present application claims benefit of and priority to U.S. provisional patent application 62/303,633, filed Mar. 4, 2016, Great Britain Patent Application 1605068.4, filed Mar. 24, 2016 and PCT/EP2017/054972, filed Mar. 2, 2017, each of which is hereby incorporated by reference for all purposes, as if set forth herein in its entirety.

FIELD OF INVENTION

The invention relates to a process for the generation of electricity. Specifically, it relates to the generation of electricity from the fluid streams used in solution mining of salt formations and apparatus for harvesting energy during the solution mining process.

BACKGROUND OF THE INVENTION

Much effort is currently being directed towards novel and renewable sources of energy which do not rely on fossil fuels.

One such area of research is the process known as pressure retarded osmosis (PRO). In this process, a semi-permeable membrane is used to separate a less concentrated solution from a more concentrated solution. The membrane causes solvent to pass from the less concentrated solution (with low osmotic pressure) to the more concentrated solution (with high osmotic pressure) by osmosis, and this leads to an increase in pressure on the side of the membrane to which the solvent diffuses due to the increased volume in the confined space. This pressure can be harnessed to generate electricity. A small number of PRO plants are in operation around the world, and these generally use differences in salinity as the driver for osmosis, typically using fresh water from a river or lake as the feed stream for the less concentrated solution, and sea water for the more concentrated solution. Helfer et al, J. Membrane Sci. 453 (2014) 337-358 is a review article describing PRO. In these pilot-scale plants the process has been found to be uneconomic due to low power densities achieved. It has been suggested that a power density of around 5 W/m$^2$ of membrane represents a level of power generation above which PRO may become economically viable. Outside of laboratories it has not generally been possible to achieve this level of power density using existing membrane technology in river/seawater mixing schemes.

A number of attempts have been made to harness the energy found in underground formations in processes involving osmosis. WO 2013/164541 describes a method for generating power by direct osmosis, in which the more concentrated solution is "production water", while the less concentrated solution is fresh water or sea water. Production water is water obtained after separation from a hydrocarbon stream during hydrocarbon production. WO 2013/164541 also mentions that a brine stream obtained from an underground formation can be used as the more concentrated solution.

It would be advantageous to provide a more efficient osmotic power generation process.

While the shift to renewable energy sources is desirable, it is clear that for the time being at least fossil fuels are likely to remain an important part of the energy mix. Accordingly there will remain a demand for storage facilities for storing such fuels. This is particularly so for storing natural gas in view of the recent discovery and widespread exploitation of natural gas from shale formations in the United States of America and elsewhere.

One known method of natural gas storage is to create large caverns in underground salt formations, for example in underground salt dome or rock salt formations. These caverns are created by a process known as solution mining. Typically, solution mining involves injecting large amounts of (fresh) water down into an underground salt formation. The salt is then dissolved by that water, and the resulting highly saline or saturated brine is returned to the surface. Solution-mined cavities gradually shrink over time, and the solution mining process may be repeated periodically in order to maintain the cavity. It will be appreciated that solution mining has other applications in addition to the production of natural gas storage caverns. For example, solution mining may be used as a means of extracting water-soluble minerals for use in downstream applications.

It would be advantageous to provide a more efficient solution mining process.

SUMMARY OF THE INVENTION

In one aspect, the present invention provides an electricity generation process comprising the steps of:
injecting an aqueous feed stream into a salt formation to dissolve the salt contained therein, and then extracting a saline stream containing said dissolved salt from the salt formation; and
converting latent osmotic energy present in said saline stream into electricity by passage through an osmotic power unit comprising a semi-permeable membrane which permits the passage of water but not the passage of salts in which said saline stream is passed over one side of the semi-permeable membrane, a low salinity stream being passed over the other side of said membrane; and using an output stream derived from the low salinity stream as the aqueous feed stream.

In another aspect, the present invention provides a power generation system comprising
a hydraulic system suitable for connection to a salt formation, said hydraulic system being arranged to provide an aqueous feed stream to the salt formation and extract a saline stream from the salt formation, and
an osmotic power unit arranged to generate electricity through Pressure Retarded Osmosis (PRO) using the difference in salinity between the aqueous feed stream and said saline stream.

DETAILED DESCRIPTION OF INVENTION

Figure 1:
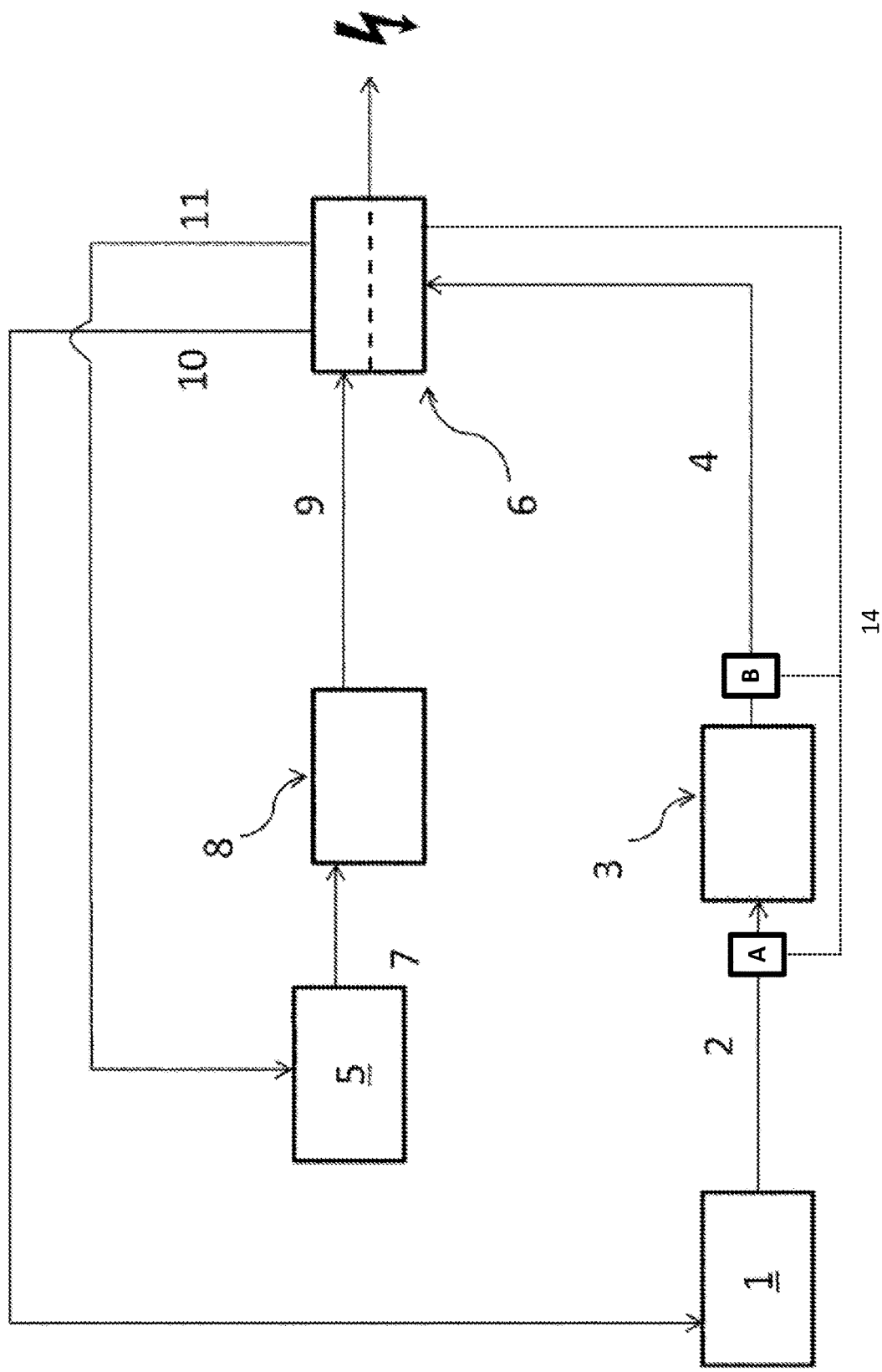
FIG. 1 shows a schematic view of one embodiment of the invention in which saline produced by solution mining a salt formation is passed first through an osmotic power unit.

The process of the present invention may provide an improved solution-mining process and/or an improved electricity generation process.

The process of the present invention uses the salinity differential between the input and output streams of a solution mining process to extract latent osmotic energy from the saline stream produced by the solution mining process by means of an osmotic power generation process. The input stream of the solution mining process, which may be referred to as an aqueous feed stream or lower salinity feed stream, is passed through an osmotic power unit prior to entering the salt formation. The output stream from the solution mining process, which is a saline stream, is passed through the osmotic power unit after leaving the salt formation. Osmotic power generation uses the salinity differential between a high-salinity stream and a low-salinity stream. The input stream of the solution mining process may be used as, or be derived from, the low-salinity stream. The output stream of the solution mining process may be used as, or form the origin of, the high-salinity stream. In this way, the input stream of the solution mining process may flow over one side of a semi-permeable membrane contained within the osmotic power unit, while the output stream of the solution mining process flows over the other.

Using the salinity differential between the input and output streams of a solution mining process may be advantageous in several ways.

The power generated by the osmotic power unit may be used in full or in part to power the solution mining process. Eliminating or reducing the reliance of the solution mining process on an external power supply may facilitate solution mining in more remote locations and/or more mobile solution mining apparatus. In some circumstances the osmotic power unit may generated surplus energy that can be used elsewhere.

Saline streams produced by solution-mining provide increased salt concentrations compared to, for example, sea water. Increased salt concentrations in the high-salinity input stream of an osmotic power unit may allow for increased power density during pressure retarded osmosis (PRO). In addition to the increased power density provided by the large osmotic pressure differential between the input and output streams of a solution mining process, saline streams from solution mining may also carry a lower risk of the osmotic membrane being fouled and/or reduce the amount of pre-treatment required in comparison to seawater, or other prior art high-salinity sources, as saline streams from salt formations are typically isolated from the wider environment. Thus, combining the solution-mining process and the osmotic power unit may result in a more efficient osmotic power generation process.

Both the solution mining process and the osmotic power generation process require pressurized fluid streams. The solution mining process requires a circulating current of a lower salinity feed stream being injected into the salt formation and a higher salinity output stream being extracted from the salt formation. The osmotic power generation process requires a pressure differential between the low-salinity and high-salinity sides of the membrane. Combining the osmotic power generation process with the solution mining process may reduce or eliminate the need to pressurize the feed streams for the osmotic power generation process because said streams are already pressurized as part of the solution mining process, thereby increasing the efficiency of the power generation process.

Moreover, the transfer of solvent across the membrane during the osmotic power generation process will result in a dilution of the saline stream extracted from the salt formation. This may facilitate the disposal of the waste stream where, for example environmental considerations, would prevent a high salinity stream being returned to a neighboring body of water. Thus, combining the solution-mining process and the osmotic power unit may make it easier to dispose of solution mining waste.

Finally, the way in which the present invention combines the solution mining process and osmotic power generation process may reduce the overall amount of fresh water consumed as compared to when the processes are carried out separately.

The process of the invention may use a solution mining process. The input to the solution mining process will be an aqueous feed stream. It will be understood that the properties of the aqueous feed stream must be such that salt from a salt formation will dissolve into the feed stream. The aqueous feed stream may be injected into a salt formation to dissolve the salt contained therein. The output of the solution mining process will be a saline stream containing the salt dissolved from the salt formation.

The process of the invention may use a saline stream obtained from a salt formation in an osmotic power generation step. The saline stream is generally subject to any necessary pretreatment steps prior to carrying out the power generation step. For example, filtration to remove solid material may be necessary, as might other conventional processes depending on the exact nature of the stream.

The salt content of the saline stream may be anything up to saturation. Preferably the salt content is at least 10% wt, preferably at least 15% wt, preferably at least 20% wt, especially at least 25% wt. It will be understood that saline streams produced by solution mining may contain a wide variety of dissolved salts, with a preponderance of sodium chloride, and that "salt content" refers to total salt content. The exact nature of the salt(s) present in such streams is not important. Similarly, the terms high(er)-salinity and low(er)-salinity are used herein to refer to streams having a corresponding "salt content"—the exact nature of the salt(s) present in such streams is not important.

The salt formation may be a salt dome or rock salt formation. The salt formation may be underground. The salt formation may be accessed via one or more bore holes. The aqueous feed stream may be injected into the salt formation via a bore hole. The saline stream may be extracted from the salt formation via a bore hole. The feed stream and the saline stream may be injected into and extracted from the salt formation in a conventional manner.

The solution-mining process may be used to produce and/or maintain a salt cavern in the salt formation for the storage of natural gas. The solution-mining process may be used to extract salt for industrial, municipal or household purposes and applications.

The osmotic power generation process is powered by osmosis, and converts latent osmotic energy into electricity. An osmotic power unit is a unit which converts latent osmotic energy into electricity. Any suitable osmotic power unit may be used in the process of the present invention. The key feature of such a unit is the presence of a semi-permeable membrane which permits the passage of water but not of dissolved salt(s). Such membranes are commercially available, and any suitable membrane may be used. In addition, novel types of membrane, for example membranes based on a lipid or amphiphilic polymer matrix containing aquaporins, which are proteins which permit the passage of water but no other substance, may be used. Such membranes are described in for example WO 2004/011600, WO 2010/091078, US 2011/0046074 and WO 2013/043118. Other novel types of membrane include graphene-based membranes, for example those described by Cohen-Tanugi et al, Nano Lett. 2012, 12(7), pp. 3602-3608 and O'Hern et al, Nano Lett. 2014, 14(3), pp. 1234-1241. More than one membrane may be present, and combinations of different types of membranes may be used. Thus the osmotic power unit may contain more than one osmosis unit, each osmosis unit containing a semi-permeable membrane. As well as at least one membrane, an osmotic power unit will include means for converting pressure or flow generated by osmosis into electricity. Typically this means will be a turbine connected to a generator, but any suitable means may be used.

As well as the saline stream produced by the solution mining process, the osmotic power generation process requires a feed stream which is an aqueous stream having lower salinity than the saline stream extracted from the salt formation. This lower salinity stream may be obtained from any source, but is typically sea water, fresh or brackish water obtained, for example, from a river or a lake, or waste water obtained from an industrial or municipal source. The economics of a process according to the invention are likely to be particularly favourable when a salt formation is located adjacent a sea, river or lake, with sourcing of the necessary streams and disposal of the waste streams both being easy and cheap. Throughout this specification, unless the context requires otherwise, "lower salinity" should be understood to include zero salinity.

The initial inputs to the osmotic power generation step are thus one higher salinity stream (the saline stream), and one lower salinity stream. After passage over a membrane, the first stream (initial higher salinity) will be reduced in salinity, while the second stream (initial lower salinity) will be increased in salinity. The output streams from a first pass over the membrane will both have lower salinity than the original saline stream, and higher salinity than the original lower salinity stream—at equilibrium, the two streams would have equal salinity, but this is unlikely to be achieved in practice. Therefore, either output stream can be reused as either the first stream or the second stream for a second pass over the original membrane, or as either the first stream or the second stream over a second membrane. These reused streams may be used alone, or merged with other input streams. The high concentrations of salt in saline streams from salt formations may facilitate the use of multi-step osmotic power generation. Each step may have a different pressure and/or flux setting depending on the difference in salinity between the initial input streams for each pass.

Tailoring the pressure and/or flux setting in this manner may increase the efficiency of the process, particularly where a plurality of steps may be used as with a saline stream from a salt formation. As long as an outgoing stream from an osmosis unit has higher salinity than the initial input stream of lower salinity, it is possible to operate an additional osmosis unit. The optimal number of cycles will depend on the initial content of the streams, the efficiency of the membranes, and the flow rates selected.

The osmotic power unit may contain more than one osmosis unit, each osmosis unit comprising a semipermeable membrane which permits the passage of water but not the passage of salt. The output from each osmosis unit will be a first outgoing stream from a first (initial higher salinity) side of the membrane and a second outgoing stream from a second (initial lower salinity) side of the membrane. These streams may be handled separately or at least partially merged.

The output from the osmotic power unit will be one or more output streams. Depending on the number of osmotic units in the osmotic power unit and the way the outgoing streams from each osmotic unit are handled the properties of these output streams may vary.

At least one output stream from the osmotic power unit will be derived from the original lower salinity stream. This stream may have higher salinity but is still capable of dissolving salt from the salt formation. This stream is used as the aqueous feed stream that is injected into the salt formation.

One output stream from the osmotic power unit may be a waste stream. The waste stream may have higher salinity that output stream derived from the original lower salinity stream. The waste stream(s) may be disposed of as required, for example by discharge into a neighboring sea, river or lake. Depending on the permissible discharge concentration into the neighboring body of water, the number of osmotic units in the system can be varied until the allowable salt concentration is obtained in the waste stream The efficiency of the process of the invention will depend upon the initial temperature and pressure of the saline stream, and also upon the quantity and nature of the salt(s) the stream contains. Another key feature determining the efficiency of the process will be the performance of the semi-permeable membrane, and optimization depends on a combination of two factors: the flux of water obtainable through the membrane, and the efficiency with which the membrane can exclude salts. The use of multiple osmosis units as described above can also affect overall process efficiency.

It will be appreciated that the steps of injecting the aqueous feed stream, extracting the saline stream and converting latent osmotic energy are carried out simultaneously.

The present invention may provide a power generation system. The power generation system may comprise a hydraulic system. The power generation system may comprise an osmotic power unit. The power generation system may be mounted on a mobile platform, for example a road vehicle for example a truck, heavy goods vehicle (HGV) or similar vehicle or a trailer for use with such a vehicle. Mounting a power generation system comprising the osmotic power unit and/or the hydraulic system on a mobile platform may facilitate solution mining in locations where power supply is limited. The method may comprise moving the power generation system mounted on the mobile platform to a first location having an underground salt formation. The method may comprise carrying out the method of the invention at the first location. The method may comprise moving the power generation system mounted on the mobile platform to a second, different, location, having an underground salt formation, and carrying out the method of the invention at the second location.

The apparatus of the present invention may comprise a solution mining system. The solution mining system may comprise one or more pumps and a control system along with other conventional means for carrying out the solution mining process. At least part of the solution mining system, for example one or more pumps and/or the control system may be mounted on the mobile platform.

In the case that the salt formation is an underground salt formation, the osmotic power unit may be located above ground. The osmotic power unit may be located on, for example mounted on, a mobile platform.

It will be understood that the process of the present invention may be described as an electricity generation process because the osmotic power unit produces electricity. It will be appreciated that the amount of electricity produced will vary depending on the process parameters. The osmotic power unit may provide enough electricity to power the solution-mining process and provide a surplus for use elsewhere, or just enough electricity to power the solution-mining process, or an external supply of power in addition to that provided by the osmotic power unit may be required to run the solution-mining process.

One example embodiment of the invention is illustrated schematically in FIG. 1. In FIG. 1, a saline stream 2 extracted from a salt formation 1 is passed through one or more pre-treatment steps 3 and the resulting stream 4 is passed to osmotic power unit 6 where it is caused to flow at one side of a semi-permeable membrane (not shown) which permits passage of water but not of salts. One of ordinary skill will recognize that pumps A and B are typical of pumps at steps/units 2, 4, 7, 9, 19 and so forth, and that conductor 12 or other suitable conductors can be used to provide power and control to such pumps or other suitable gas or liquid motive equipment. An aqueous stream 7 which is of lower salinity than streams 2 and 4, from water source 5 which may for example be sea water, water from a river or lake, or waste water, is passed through one or more pre-treatment steps 8 and the resulting stream 9 is passed to osmotic power unit 6 where is it caused to flow at the other side of the semi-permeable membrane. Within osmotic power unit 6, water flows from stream 9 into stream 4 via the semi-permeable membrane causing an increase in pressure due to the increased volume in a confined space, and this excess pressure is ultimately converted to electricity by conventional means not shown. This flow of water will increase the salinity of initially lower salinity stream 9, and reduce the salinity of second stream 4. Output from the osmotic power unit 6 forms an aqueous exit stream 10 derived from the initial lower salinity stream (i.e. stream 9 minus the water that has flowed via the semi-permeable membrane) and an aqueous exit stream 11 derived from the saline stream (i.e. stream 4 plus the water than has flowed via the semi-permeable membrane). Aqueous exit stream 10 is injected into the salt formation 1 where it dissolves the salt contained therein and is subsequently extracted as saline stream 2. Aqueous exit stream 11 may be disposed of into the water-source 5. For example sea, river or lake, from which stream 7 was extracted. Alternatively, part or all of aqueous exit stream 11 may be combined with aqueous exit stream 10 for insertion into the salt formation. In some embodiments aqueous exit stream 11 may be subject to further processing steps to extract the salt and/or other minerals contained therein for use in industry.

Figure 2:
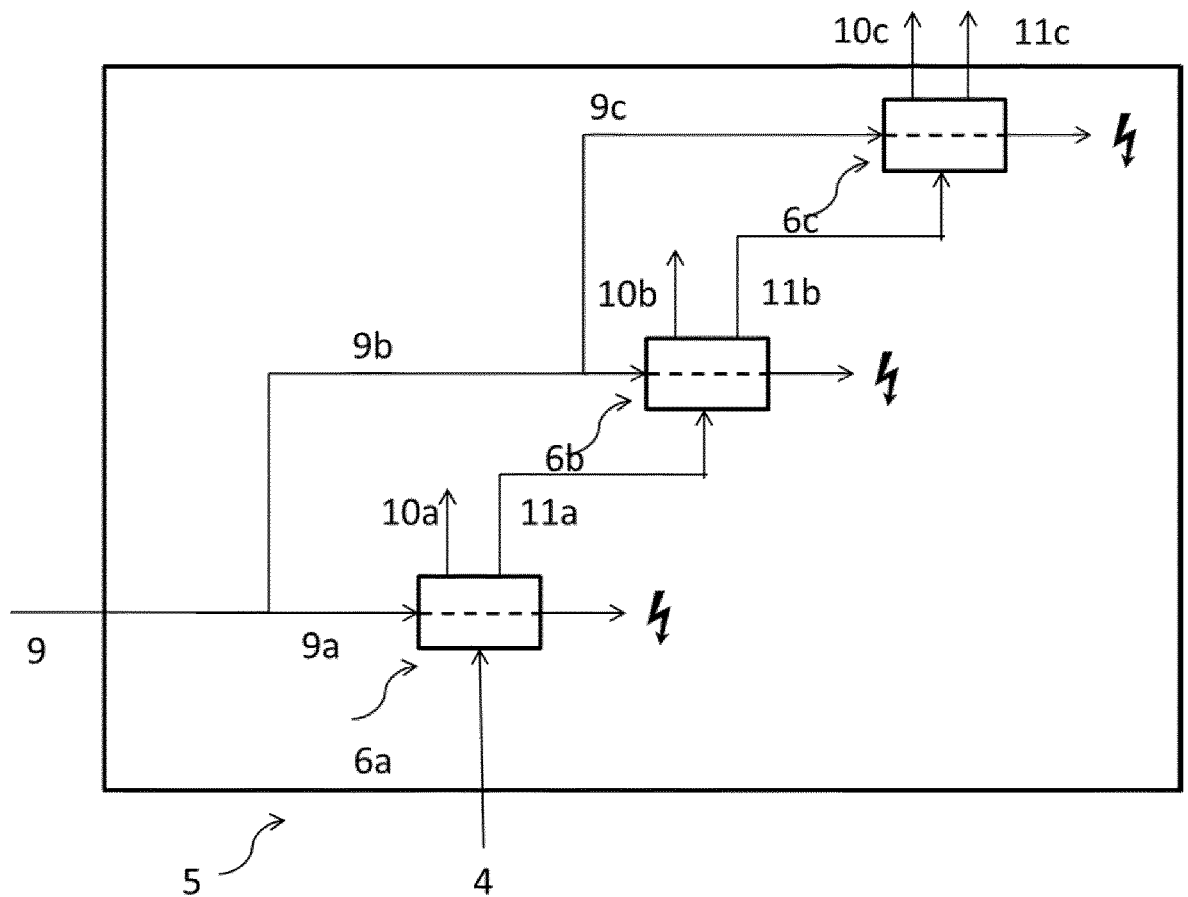
FIG. 2 shows a variant of FIG. 1 in which multiple osmosis units are used.

FIG. 2 shows a portion of a variant of the process of FIG. 1 in which the osmotic power unit 5 comprises multiple osmosis units 6a, 6b and 6c connected in series. Like elements are denoted with like reference numerals. Only those elements of the FIG. 2 embodiments which differ from the FIG. 1 embodiment will be discussed here. Each osmosis unit 6a, 6b and 6c contains a semi-permeable membrane (not shown) which permits passage of water but not of salts. Lower salinity stream 9 branches into three streams, 9a, 9b, 9c, each going to a different one of the osmotic units 6a, 6b, 6c. Original high saline stream 4 flows at one side of the semipermeable membrane of the first unit 6a, while lower salinity stream 9a obtained from original lower salinity stream 9 flows at the other side. Output stream 10a from osmosis unit 6a, which is derived from lower salinity stream 9a is injected into the salt formation as discussed in connection with FIG. 1. Output stream 11a from osmosis unit 6a, which has a salt content lower than that of original input stream 4, is fed to a second osmosis unit 6b where it is passed over one side of a semi-permeable membrane. A second input stream 9b of relatively low salinity water obtained from stream 9 flows at the other side. Although the difference in salinity between streams 11a and 9b is lower than the difference in salinity between streams 4 and 9a, there is still a difference in salinity, and electricity can be generated by osmosis. Output stream 10b from osmosis unit 6b, which is derived from lower salinity stream 9b is injected into the salt formation as discussed in connection with FIG. 1. Output stream 11b from osmosis unit 6b, which has a salt content lower than that of original input stream 4, and also lower than stream 11a, is fed to a third osmosis unit 6c where it is passed over the other side of a semi-permeable membrane from a further input stream 9c of relatively low salinity water. Although the difference in salinity between streams 11b and 9c is lower than the difference in salinity between streams 4 and 9a, or between streams 11a and 9b, there is still a difference in salinity, and electricity can be generated by osmosis. Output stream 10c from osmosis unit 6c, which is derived from lower salinity stream 9c is injected into the salt formation as discussed in connection with FIG. 1. Output streams from the process of FIG. 2 are aqueous exit streams 10a, 10b, 10c which are derived from the initial lower salinity stream 9 and the injected into the salt formation, and aqueous stream 11c which is derived from the saline stream 4.

Figure 3:
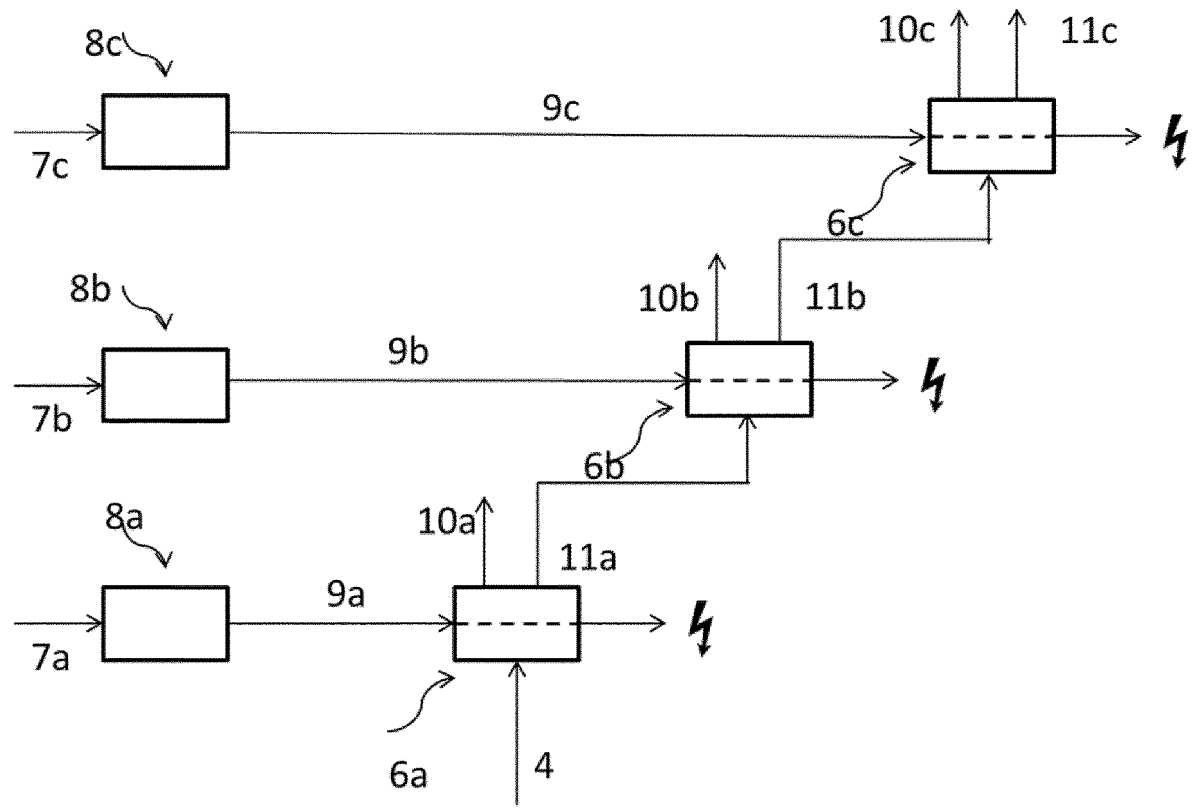
FIG. 3 shows a variant of FIG. 2 with alternative input streams.

FIG. 3 shows a variant of FIG. 2 in which input streams 9a, 9b and 9c of relatively low salinity water are provided as separate input streams 7a, 7b and 7c, each undergoing one or more pre-treatments steps 8a, 8b and 8c.

Figure 4:
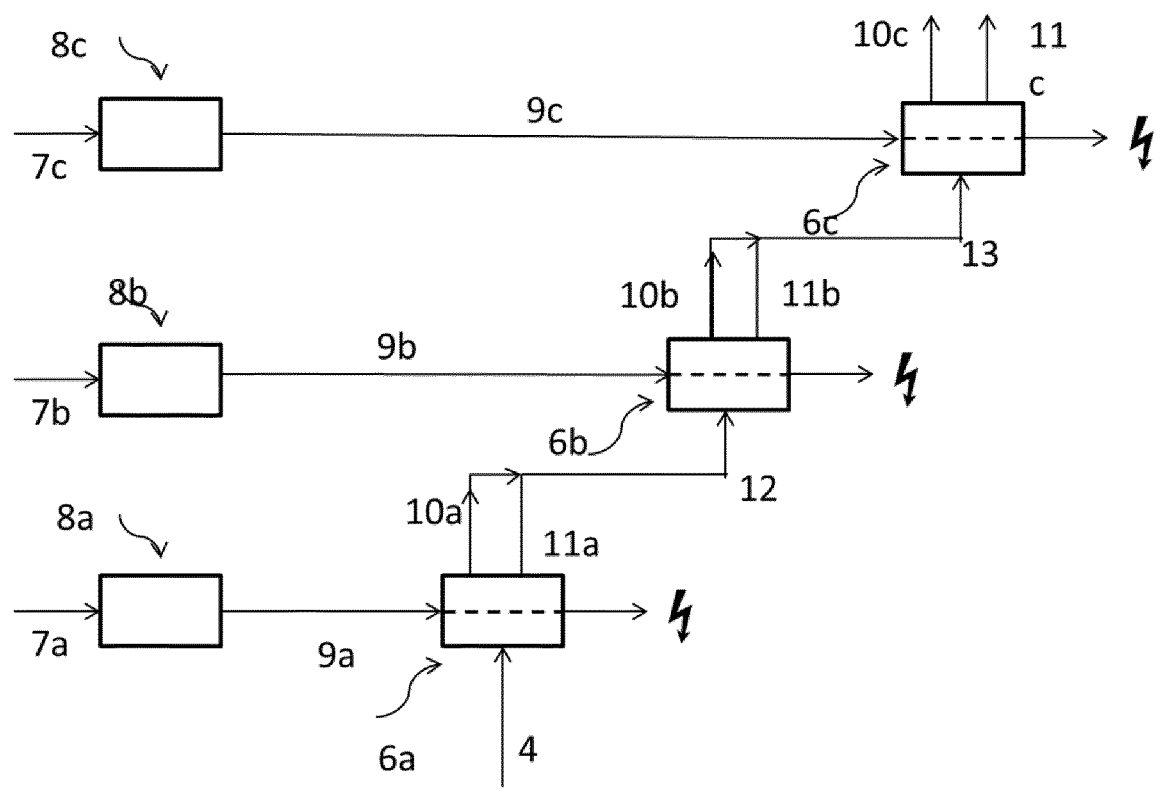
FIG. 4 shows a variant of FIG. 3 with alternative output streams.

FIG. 4 shows a variant of FIG. 3 in which output streams are handled in a different way. Outlet streams 10a and 11 a from osmosis unit 6a are merged, and at least part of the merged stream is provided as input stream 12 to osmosis unit 6b. The merged stream 12 will have a salt content lower than that of original input stream 4, and although the difference in salinity between stream 12 and stream 9b is lower than the difference in salinity between streams 4 and 9a, there is still a difference in salinity, and electricity can be generated by osmosis. Similarly, outlet streams 10b and 11b from osmosis unit 6b are merged, and at least part of the merged stream is provided as input stream 13 to osmosis unit 6c.

It will be understood that FIGS. 2, 3 and 4 show an osmosis power unit 6 consisting of 3 osmosis units 6 each containing a semi-permeable membrane, but that any suitable number of units can be used, the choice being determined by a combination of technical and economic factors. In general, the higher the initial salinity of the saline stream 1, the higher the number of osmosis units which may be used.

Figure 5:
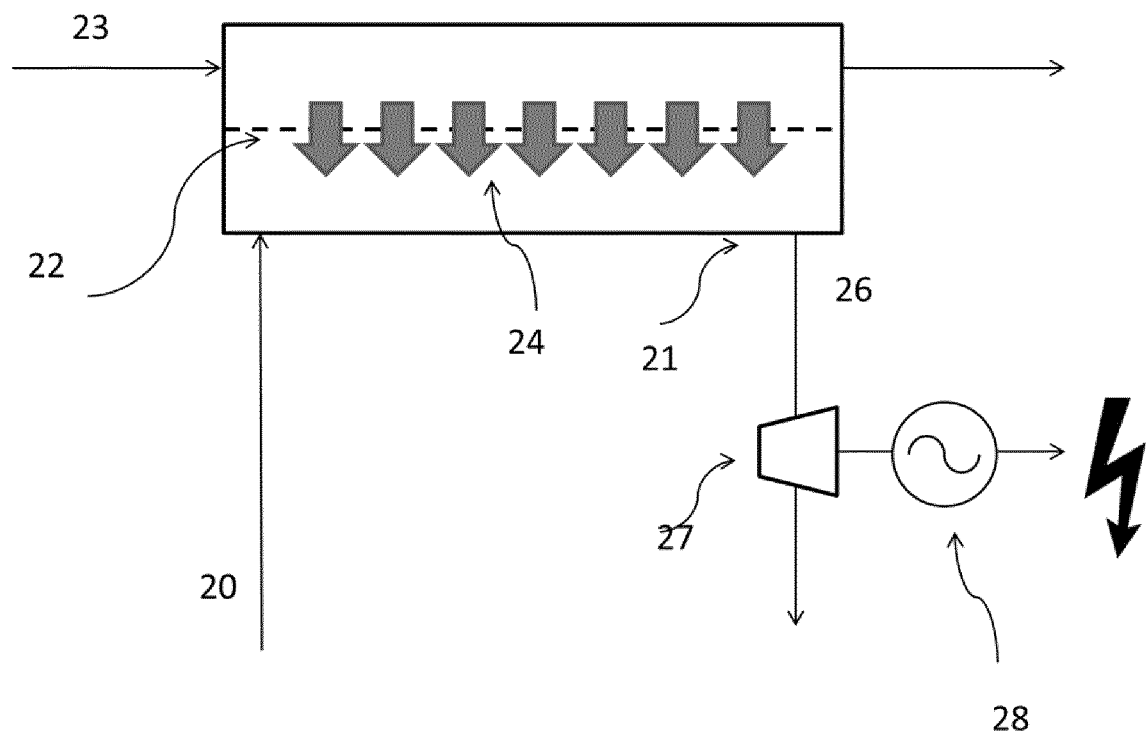
FIG. 5 shows an osmotic power unit 6 of FIG. 1.

FIG. 5 shows more details of an osmotic power unit 5 of FIG. 1. A saline stream 20 extracted from a salt formation (which may for example be stream 2 or 4 of FIG. 1) is passed to an osmosis unit 21 containing a semi-permeable membrane 22 which permits passage of water but not of salts, and flows at one side of membrane 22. An aqueous stream 23 which is of lower salinity than stream 20 enters osmosis unit 21 and flows at the other side of membrane 22. Arrows 24 show the direction of water transport by osmosis across membrane 22. An output stream 25 derived from original input stream 23 and now containing a higher concentration of salt, leaves osmosis unit 21. An output stream 26 consisting of original input stream 20 now containing a lower concentration of salt, leaves osmosis unit 21 via a turbine 27 which drives a generator 28 thus producing electricity.

Figure 6:
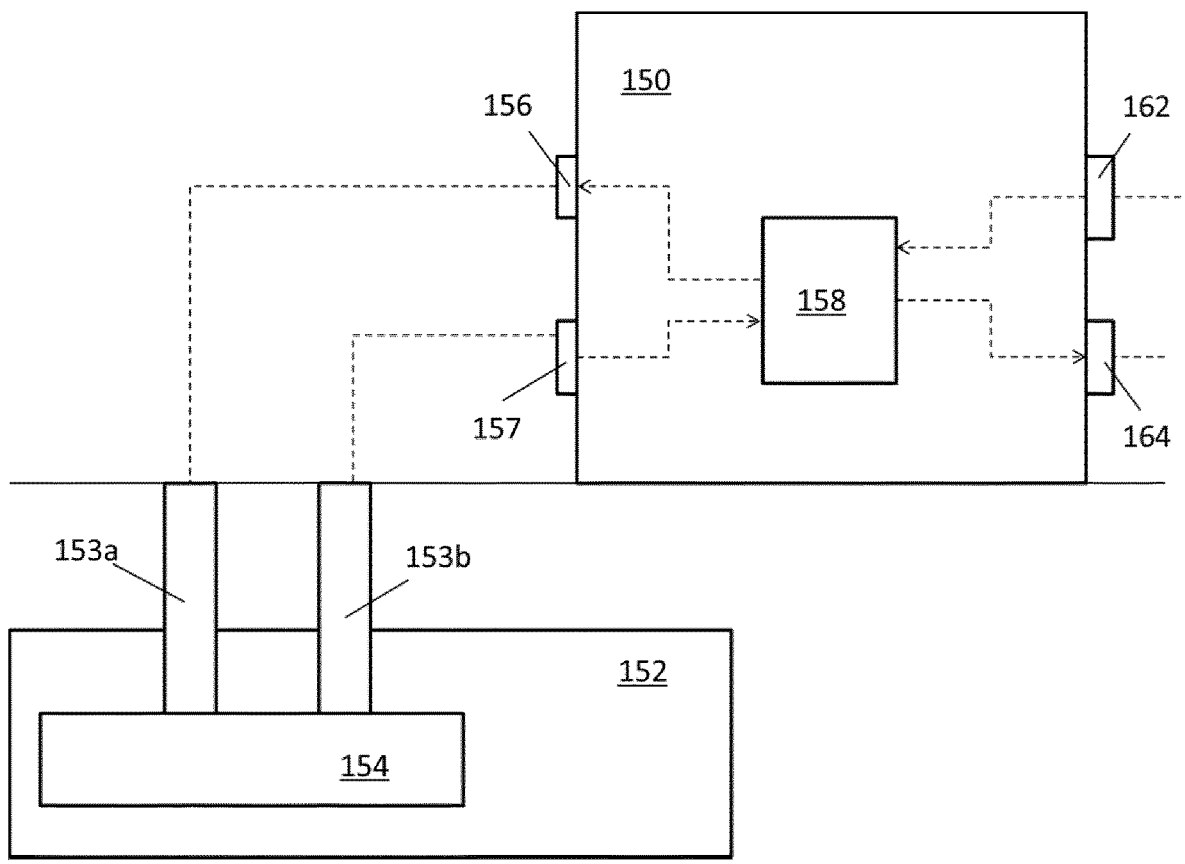
FIG. 6 shows a process unit using the process of FIG. 1.

FIG. 6 shows a schematic diagram of a mobile production unit 150 for use with a salt formation 152. Bore holes 153a and 153b extend from the surface to a salt cavern 154 located within the salt formation 152. An outflow port 156 of production unit 150 is connected to bore hole 153a and an inflow port 157 connected to borehole 153b (these connections being shown with dashed lines in FIG. 6). The mobile unit 150 also comprises an osmotic power unit 158, and pumps and other elements of a solution mining system not shown here for clarity. The mobile unit 150 further comprises an inflow port 162 and output flow port 164, both connected to a water source (not shown). Within mobile unit 150 a hydraulic system connects the osmotic power unit 158 to the various ports as follows (shown by dashed lines in FIG. 6); inflow port 162 is connected to the low-salinity input of the osmotic power unit, outflow port 164 with the waste output of osmotic power unit 158, outflow port 156 with the osmotic power unit output for the stream derived from the low-salinity input, and inflow port 157 with the high-salinity input of osmotic power unit 158. Pumps (not shown) are located at various points on the hydraulic system in order to move the fluid in the required direction.

In use, a low salinity stream is drawn into osmotic power unit 158 from the water source via port 162 under the action of a pump. After passing over the membrane (not shown) the stream derived from the low-salinity input is injected by a pump down bore hole 153a into the salt cavern 154 via port 156. Simultaneously, a near saturated saline stream is drawn up borehole 153b from the salt cavern 154 under the action of a pump and enters the process unit via port 157. From port 157 the saline stream is pumped to the high-salinity input of the osmotic power unit. After passing over the membrane (not shown) the stream derived from the high-salinity input is evacuated through port 164 and returned to the water source.

The invention claimed is:

1. An electricity generation process comprising the steps of:
   injecting an aqueous feed stream into a salt formation to dissolve the salt contained therein, and then extracting a saline stream containing said dissolved salt from the salt formation; and
   converting latent osmotic energy present in said saline stream into electricity by passage through an osmotic power unit comprising a semi-permeable membrane which permits the passage of water but not the passage of salts in which said saline stream is passed over one side of the semi-permeable membrane, a low salinity stream, the low salinity stream being a stream with lower salinity than said saline stream, being passed over the other side of said membrane; and
   wherein the aqueous feed stream is passed through the osmotic power unit as the low salinity stream before being injected into the salt formation.

2. The process as claimed in claim 1, in which the salt formation is a salt dome or rock salt formation.

3. The process as claimed in claim 1, in which the steps of injecting the aqueous feed stream and extracting the saline stream are utilized in conjunction with one or more bore holes that are formed so as to produce or maintain a volume of a salt cavern in the salt formation for the storage of natural gas.

4. The process as claimed in claim 1, in which the steps of injecting the aqueous feed stream and extracting the saline stream are used to produce salt for industrial, municipal or household purposes.

5. The process as claimed in claim 1, in which at least some of the electricity generated by the osmotic power unit is used to power the process of injecting the aqueous feed stream and extracting the saline stream.

6. The process as claimed in claim 1, in which the osmotic power unit contains more than one osmosis unit each comprising a semipermeable membrane which permits the passage of water but not the passage of salts.

7. The process as claimed in claim 6, in which an output stream from one of the more than one osmosis unit is used as an input stream for a second of the more than one osmosis unit.

8. The process as claimed in claim 1, in which the saline stream has a salt content of at least 10% wt.

9. The process as claimed in claim 8, in which the saline stream has a salt content of at least 15% wt.

10. The process as claimed in claim 9, in which the saline stream has a salt content of at least 25% wt.

11. The process as claimed in claim 1, in which the aqueous feed stream is sea water, fresh water or brackish water obtained from a river or lake, or waste water obtained from an industrial or municipal source.

12. The process as claimed in claim 5, in which the osmotic power unit is mounted on a mobile platform.

13. The process as claimed in claim 12, wherein a hydraulic system comprises one or more first pumps configured to inject the aqueous feed stream into the salt formation and/or one or more second pumps configured to extract the saline stream from the salt formation, the process further comprising mounting the hydraulic system on the mobile platform with the osmotic power unit.

14. The process as claimed in claim 12 further comprising moving the osmotic power unit mounted on the mobile platform to a first location having an underground salt formation.

15. The process as claimed in claim 14 further comprising performing the injecting and converting steps at the first location.

16. The process as claimed in claim 15 further comprising:
   moving the power generation system mounted on the mobile platform to a different location associated with a different underground salt formation; and
   performing the injecting and converting steps at the second location.

17. The process as claimed in claim 1, comprising combining part or all of the saline stream after passage through the osmotic power unit with the low salinity stream after passage through the osmotic power unit for injection into the salt formation.

18. An electricity generation process comprising the steps of:
   controlling one or more first pumps to inject an aqueous feed stream into a salt formation to dissolve the salt contained therein, and then controlling one or more second pumps to extract a saline stream containing said dissolved salt from the salt formation;
   converting latent osmotic energy present in said saline stream into electricity by passage through an osmotic power unit comprising a semi-permeable membrane which permits the passage of water but not the passage of salts in which said saline stream is passed over one side of the semi-permeable membrane, a low salinity stream, the low salinity stream being a stream with lower salinity than said saline stream, being passed over the other side of said membrane; and
   wherein the aqueous feed stream is used as the low salinity stream that is passed over the other side of said membrane before being injected into the salt formation.

19. The process as claimed in claim 18, in which the one or more first pumps and the one or more second pumps are each operatively coupled to one or more bore holes that are formed so as to produce or maintain a volume of a salt cavern in the salt formation.

20. The process as claimed in claim 18, in which at least some of the electricity generated by the osmotic power unit is coupled to one or more of the first pumps or the second pumps by one or more conductors and used to power the process of injecting the aqueous feed stream and extracting the saline stream.

* * * * *